W. A. ZIMMER.
SHAFT PACKING.
APPLICATION FILED MAY 16, 1910.

990,943.

Patented May 2, 1911.

Witnesses
Oliver M. Kappler
Brennan B. West

Inventor
Wilson A. Zimmer
By Bates, Fouts & Hull
Attys.

THE NORRIS PETERS CO., WASHINGTON, D. C.

UNITED STATES PATENT OFFICE.

WILSON A. ZIMMER, OF CLEVELAND, OHIO, ASSIGNOR, BY MESNE ASSIGNMENTS, TO THE IDEAL PEERLESS MANUFACTURING COMPANY, OF CLEVELAND, OHIO, A CORPORATION OF OHIO.

SHAFT-PACKING.

990,943.  Specification of Letters Patent.  Patented May 2, 1911.

Application filed May 16, 1910. Serial No. 561,660.

*To all whom it may concern:*

Be it known that I, WILSON A. ZIMMER, a citizen of the United States, residing at Cleveland, in the county of Cuyahoga and State of Ohio, have invented a certain new and useful Improvement in Shaft-Packings, of which the following is a full, clear, and exact description, reference being had to the accompanying drawings.

This invention relates to shaft packings, and has for its general object the production of a packing which is capable of easy application to a shaft; which is economical of production; which is durable; and which is of marked efficiency, withstanding very high pressures without the development of any leakage.

Figure 1:
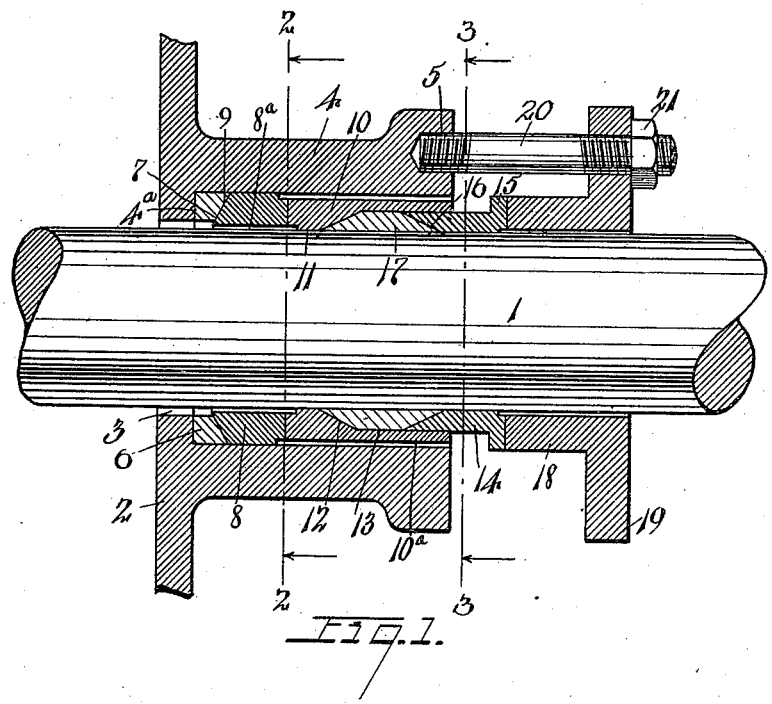
Figure 2:
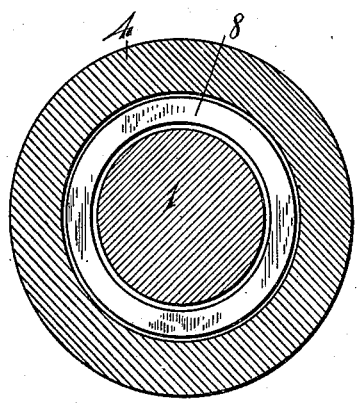
Figure 3:
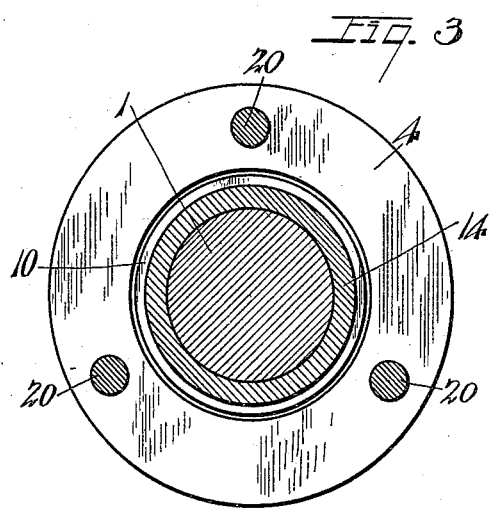

In the embodiment of my invention shown in the drawings herein and by means of which the above advantages are secured, Figure 1 represents a longitudinal sectional view through a stuffing box and associated packing members, the shaft being shown in elevation. Fig. 2 represents a sectional detail corresponding to the line 2—2 of Fig. 1, looking in the direction of the arrows, and Fig. 3 a similar view taken on the line 3—3 of Fig. 1 and looking in the direction of the arrows.

Describing the various parts by reference characters, 1 denotes the shaft, which is shown as projecting through a wall 2 of the casing, said wall being provided with an aperture 3 of somewhat greater diameter than the shaft and with a stuffing box 4 projecting outwardly therefrom and of greater internal diameter than the aperture 3, providing a shoulder 4ᵃ between the aperture and the stuffing box. The outer end of the stuffing box is provided with threaded recesses 5 for the reception of the inner ends of bolts, to be described hereinafter. In the angular recess formed at the junction of the body of the stuffing box 4 with the wall 2, there is inserted a ring 6 of Babbitt, or anti-friction, metal. This ring is adapted to fit the faces of the angular recesses and its internal diameter is shown as being the same as that of the aperture 3. The outer face of said ring is beveled from the inner periphery outwardly, as shown at 7.

Outside of the ring 6 there is located a thrust ring 8. This thrust ring is of such diameter as to fit more or less snugly within the bore of the stuffing box 4, and is preferably of slightly less diameter than the ring 6 and of greater diameter than the shaft 1 and is provided with a beveled face 9 at its inner end conforming to the beveled face 7 of the ring 6. The outer face of the ring 8 extends substantially at right angles to the shaft 1 and forms a thrust bearing for the corresponding face at the inner end of the ring 10. The inner portion of the ring 10 is of substantially the same diameter as the diameter of the shaft 1, providing a face 11 which is adapted to bear against the shaft. From the outer edge of the face 11, the bore of the ring 10 flares outwardly, providing a beveled or frusto-conical surface 12 the outer end of which merges with the cylindrical inner surface 13 of the outer portion of the ring. The ring 10 is of such length as to extend substantially to the outer edge of the stuffing box 4 and is of somewhat less diameter than the internal diameter of the stuffing box whereby an annular space 10ᵃ is provided between the ring and the bore of the stuffing box, which space is substantially the same width as the space 8ᵃ provided between the ring 8 and the shaft 1.

14 denotes a gland surrounding the shaft 1 and fitting the same more or less snugly, said gland being provided with a flange 15 at its outer end. The external diameter of this gland is such as to enable it to fit snugly within the outer end of the ring 10, and the inner end of the gland is provided with a beveled face 16 extending from the inner to the outer periphery of the gland and in a direction the reverse of the beveled surface 12. Between the beveled surfaces 12 and 16, a ring 17 is inserted, said ring being of Babbitt or anti-friction metal having its opposite ends tapered to conform to the beveled surfaces 12 and 16, respectively, with its inner and outer surfaces bearing respectively against the shaft 1 and the surface 13 of the ring 10.

Outside of the gland 14 the adjusting sleeve 18 is provided. This sleeve is of somewhat greater internal diameter than the shaft 1, to allow for adjustment, and bears at its inner end against the flange 15, being provided at its outer end with a flange 19 through apertures in which extend the bolts 20, which are threaded or otherwise suitably secured in the apertures 5 of the stuffing box, the bolts being provided each with a nut 21 by means of which the sleeve may be adjusted. By setting up on the nuts 21, the gland 14 is pushed inwardly, forcing the outer surfaces of the ring 17 against the surfaces 12, 13 and 16 and the inner surface of the ring against the outer surface of the shaft. The thrust on the ring 10 is transmitted to the ring 8 and thereby against the ring 6. This wedges the ring 6 outwardly into its seat and makes a tight joint against the passage of steam or other fluid tending to pass through the rings 6 and 8, while the action of the inclines on the ring 17 forces the latter into very close engagement with the shaft and absolutely prevents leakage through said ring. The leakage between the adjacent ends of the rings 8 and 10 is prevented by the fact that a thrust bearing is formed here, providing a ground joint, a similar joint being provided between the outer end of the gland 14 and the inner end of the sleeve 18. The provision of the spaces 8ª and 10ª between the shaft and the ring 8 and between the stuffing box and the ring 10, respectively, obviates the necessity for accurately centering the shaft.

Among the advantages of my construction are its simplicity; the ability to dispense with springs and rubber for packing purposes; the provision of an all metal packing; the adjustability; and the adaptability of the same to all ordinary incidents of use, together with economy, durability and efficiency in operation.

Having thus described my invention, what I claim is:

1. The combination, with a shaft, of a stuffing box surrounding and spaced from said shaft, said stuffing box having a contracted bore at its inner end with a shoulder provided between said bore and the inner wall of the stuffing box, an anti-friction ring fitted in the angle formed at the junction of the shoulder and the stuffing box wall, said ring having its outer surface beveled outwardly from the inner periphery, a ring within the stuffing box and surrounding the shaft and having its inner end beveled complementarily to the beveled outer end of the former ring and having a bearing surface at its opposite end, a third ring within the stuffing box and having an end adapted to bear against the outer end of the second ring and provided with an outwardly flaring inner surface and a cylindrical bore with which the outer portion of such surface merges, a gland adapted to fit in the cylindrical end of the third ring and provided at its inner end with a surface which is beveled from the bore thereof, a ring of anti-friction metal within the third ring and having beveled surfaces complementary to the beveled surface of said ring and the beveled surface of the gland respectively, a sleeve surrounding said shaft and adapted to bear at its inner end against said gland, and means for adjustably securing said sleeve to the stuffing box.

2. The combination, with a shaft, of a stuffing box surrounding and spaced from said shaft, said stuffing box having a contracted bore at its inner end with a shoulder provided between said bore and the inner wall of the stuffing box, an anti-friction ring fitted in the corner formed at the junction of the shoulder and the stuffing box wall, said ring having its outer surface beveled outwardly from the inner periphery and being of greater internal diameter than said shaft, a ring within the stuffing box and surrounding the shaft and of greater internal diameter than said shaft and having its inner end beveled complementarily to the beveled outer end of the former ring and having a bearing surface at its opposite end, a third ring within the stuffing box and being of less external diameter than the internal diameter of the stuffing box and having an end adapted to bear against the outer end of the second ring and provided with an outwardly flaring inner surface and a cylindrical bore with which the outer portion of such surface merges, a gland adapted to fit in the cylindrical end of the third ring and provided at its inner end with a surface which is beveled from the bore thereof, a ring of anti-friction metal within the third ring and having beveled surfaces complementary to the beveled surface of said ring and the beveled surface of the gland, respectively, a sleeve surrounding said shaft and of greater internal diameter than the shaft and adapted to bear at its inner end against said shoulder, and means for adjustably securing said sleeve to the stuffing box.

3. The combination, with a shaft, of a stuffing box, a thrust ring in said stuffing box of greater internal diameter than the shaft, a ring within said stuffing box and of less external diameter than the internal diameter of said stuffing box, the latter ring having a surface adjacent to its inner end adapted to engage the shaft and provided with a beveled inner surface extending outwardly from the former surface, a ring of anti-friction metal in the latter ring and having its inner end provided with a surface which is inclined complementarily with respect to the beveled surface of the second ring, a gland slidable within the second ring and adapted to engage the packing ring therein, a sleeve surrounding the shaft and adapted to engage said gland, and means whereby said sleeve may be adjusted.

4. The combination, with a shaft, of a stuffing box surrounding said shaft, the stuffing box being provided with a contracted bore at its inner end which is of greater diameter than the diameter of the shaft, a ring of anti-friction metal in the stuffing box and located at the inner end of the wall thereof and of substantially the same external diameter as the internal diameter of said wall, said ring having a beveled inner surface extending outwardly from its inner periphery, a ring within the stuffing box and having its inner end beveled complementarily to the outer end of the former ring and of greater internal diameter than the external diameter of the shaft, a third ring within said stuffing box which is of less external diameter than the internal diameter of the box and adapted to rotate against the outer end of the second ring, and means, located within the third-mentioned ring, providing a tight joint with the exterior surface of the shaft.

5. The combination, with a shaft, of a stuffing box surrounding the same, a ring near the inner end of the stuffing box, means forming a tight joint between the exterior of the said ring and the stuffing box, a second ring mounted within the stuffing box and adapted to bear against the outer end of the first ring, the first ring being spaced from the shaft and the second ring being spaced from the interior of the stuffing box and having near its inner end a surface adapted to engage the shaft and provided with a beveled inner surface extending outwardly from said surface and with a cylindrical surface extending outwardly from the surface, a packing ring of anti-friction metal having cylindrical inner and outer surfaces, the outer surface being of less length than the inner surface and connected thereto by oppositely inclined surfaces the inner of which conforms to the tapered surface of the second-mentioned ring, a gland having its inner end tapered complementarily to the tapered outer surface of the anti-friction ring and adapted to fit within the bore of the second ring, and means whereby said gland may be adjusted toward and from the stuffing box.

6. The combination, with a shaft, of a stuffing box surrounding the same, a ring near the inner end of the stuffing box, means forming a tight joint between the exterior of the said ring and the stuffing box, a second ring mounted within the stuffing box and adapted to bear against the outer end of the first ring, the first ring being spaced from the shaft and the second ring being spaced from the interior of the stuffing box and having near its inner end a surface adapted to engage the shaft and provided with a beveled inner surface extending outwardly from said surface, a packing ring of anti-friction metal having a cylindrical inner surface adapted to engage the shaft and having its inner end inclined complementarily to the beveled surface of the second ring, a gland engaging said packing ring, and means whereby said gland may be adjusted.

7. The combination, with a shaft, of a stuffing box surrounding the shaft, a thrust ring in the stuffing box and of greater internal diameter than the external diameter of said shaft, means forming a tight joint between the exterior of the ring and the stuffing box, a second ring mounted within the stuffing box and adapted to bear against the outer end of the thrust ring and having a surface adapted to engage the shaft and being of less diameter than the internal diameter of the stuffing box, the second ring having a recess for the reception of packing, a gland adapted to enter said recess, and means for adjusting said gland.

In testimony whereof, I hereunto affix my signature in the presence of two witnesses.

WILSON A. ZIMMER.

Witnesses:
J. B. HULL,
BRENNAN B. WEST.